US012674115B2

(12) United States Patent
Romero et al.

(10) Patent No.: US 12,674,115 B2
(45) Date of Patent: Jul. 7, 2026

(54) SOLID CLEANSING COMPOSITIONS AND METHODS FOR THE SAME

(71) Applicant: Colgate-Palmolive Company, New York, NY (US)

(72) Inventors: Jesus Ivan Romero, Mexico City (MX); Reina Espinosa, Estado de México (MX); Sara Morales, Mexico City (MX); Roberto Hernandez, Del.Miguel Hidalgo (MX)

(73) Assignee: Colgate-Palmolive Company, New York, NY (US)

( * ) Notice: Subject to any disclaimer, the term of this patent is extended or adjusted under 35 U.S.C. 154(b) by 869 days.

(21) Appl. No.: 17/859,447

(22) Filed: Jul. 7, 2022

(65) Prior Publication Data

US 2023/0016131 A1 Jan. 19, 2023

Related U.S. Application Data

(60) Provisional application No. 63/220,101, filed on Jul. 9, 2021.

(51) Int. Cl.

| | |
|---|---|
| ***C11D 3/12*** | (2006.01) |
| ***A61Q 15/00*** | (2006.01) |
| ***A61Q 19/02*** | (2006.01) |
| ***C11D 3/14*** | (2006.01) |

(52) U.S. Cl.
CPC ............ *C11D 3/1213* (2013.01); *A61Q 15/00* (2013.01); *A61Q 19/02* (2013.01); *C11D 3/126* (2013.01); *C11D 3/14* (2013.01)

(58) Field of Classification Search
CPC ....... C11D 3/1213; C11D 3/126; C11D 3/114; A61Q 15/00; A61Q 19/02
See application file for complete search history.

(56) References Cited

U.S. PATENT DOCUMENTS

| | | | | |
|---|---|---|---|---|
| 4,755,319 A * | 7/1988 | Smolka | C11D 3/128 | 510/315 |
| 5,122,418 A * | 6/1992 | Nakane | A61Q 19/00 | 424/47 |
| 8,729,137 B2 | 5/2014 | Misner et al. | | |
| 8,877,696 B2 | 11/2014 | Oh et al. | | |
| 9,364,424 B2 * | 6/2016 | Caetano | A61Q 19/08 | |
| 9,750,667 B2 | 9/2017 | Misner et al. | | |
| 2005/0123573 A1 | 6/2005 | Spadini et al. | | |
| 2005/0220736 A1 | 10/2005 | Polonka et al. | | |
| 2006/0111259 A1 | 5/2006 | Chakrabarty et al. | | |
| 2006/0157212 A1 * | 7/2006 | Berube | C09C 1/42 | 106/444 |
| 2007/0238634 A1 * | 10/2007 | Foland | C11D 17/049 | 510/406 |
| 2007/0256247 A1 * | 11/2007 | Privitera | C11D 17/049 | 8/115.51 |
| 2008/0115302 A1 * | 5/2008 | Kilkenny | A47L 13/254 | 15/210.1 |
| 2008/0293811 A1 * | 11/2008 | Oguchi | A61K 8/39 | 514/547 |
| 2012/0295987 A1 | 11/2012 | Misner et al. | | |
| 2013/0195781 A1 * | 8/2013 | Amin | A61K 8/64 | 514/8.1 |
| 2013/0252869 A1 * | 9/2013 | Oh | C11D 1/835 | 510/491 |
| 2016/0074315 A1 * | 3/2016 | Caetano | A61K 8/9789 | 424/59 |
| 2018/0216048 A1 * | 8/2018 | Agarkhed | A61K 8/345 | |
| 2022/0287944 A1 * | 9/2022 | Costache | A61K 8/64 | |
| 2023/0016131 A1 * | 1/2023 | Romero | A61Q 19/10 | |

FOREIGN PATENT DOCUMENTS

| | | | |
|---|---|---|---|
| CA | 3222285 A1 * | 1/2023 | A61K 8/0216 |
| DE | 102009027483 A1 * | 1/2011 | A61K 8/4926 |
| DE | 102010026465 A1 * | 5/2011 | A61K 8/9789 |
| WO | 2017/084867 | 5/2017 | |
| WO | WO-2017084867 A1 * | 5/2017 | A61K 8/361 |

OTHER PUBLICATIONS

DE 102009027483 A1 English Translation. (Year: 2025).*
International Search Report and the Written Opinion of the International Searching Authority issued in International Application PCT/US2022/036320 mailed Jan. 20, 2023.
Unilever, 2021, "White Beauty Bar", Mintel Database GNPD AN: 9014696.

* cited by examiner

*Primary Examiner* — Liam J Heincer
*Assistant Examiner* — M. Reza Asdjodi

(57) ABSTRACT

Solid cleansing compositions and methods for the same are disclosed herein. The solid cleansing composition may include a cleansing component and one or more whitening agents. The one or more whitening agents may include one or more of a metal oxide, a clay, a coloring agent, or combinations thereof. The solid cleansing composition may have a whiteness, as measured via a Hunter Whiteness Index (L) of from about 60 to about 90.

14 Claims, No Drawings

SOLID CLEANSING COMPOSITIONS AND METHODS FOR THE SAME

CROSS-REFERENCE TO RELATED APPLICATION

This application claims the benefit of, and priority to, U.S. Provisional Application No. 63/220,101, filed Jul. 9, 2021, the contents of which are hereby incorporated herein by reference in their entirety.

BACKGROUND

Conventional solid cleansing compositions, such as bar soaps, are often fabricated or produced from raw materials that produce solid cleansing compositions having off-white colors and tones (e.g., yellow colors and tones). The off-white colors and tones are often exacerbated when the raw materials are provided by varying suppliers that utilize varying methods of manufacturing or producing the raw materials. In view of the foregoing, conventional solid cleansing compositions often incorporate titanium dioxide to improve or provide whiteness and thereby improve consumer acceptance. Titanium dioxide with a high refractive index, however, is cost prohibitive.

What is needed, then, are improved whitening agents for solid cleansing compositions, and methods for improving whiteness of the solid cleansing compositions.

BRIEF SUMMARY

This summary is intended merely to introduce a simplified summary of some aspects of one or more implementations of the present disclosure. Further areas of applicability of the present disclosure will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities embodied in the present disclosure may be achieved by providing a solid cleansing composition including a cleansing component and one or more whitening agents. The one or more whitening agents may include one or more of a metal oxide, a clay, a coloring agent, or combinations thereof. The solid cleansing composition may have a whiteness, as measured via a Hunter Whiteness Index (L) of from about 60 to about 90.

In at least one implementation, the whitening agents may include the metal oxide.

In at least one implementation, the metal oxide may include zinc oxide (ZnO).

In at least one implementation, the metal oxide may be substantially free of titanium dioxide.

In at least one implementation, the whitening agents may include the clay.

In at least one implementation, the clay may include one or more of bentonite, kaolin, kaolinite, calcined kaolin, metakaolin, hydrous kandite clay, halloysite or ball clay, smectite, illite, chlorite, hormite, beidelite, sepiolite, alunite, hydrotalcite, nontronite, hectorite, attapulgite, pimelite, muscovite, willemseite, minnesotaite, antigorite, amesite, china clay, halloysite, or combinations thereof.

In at least one implementation, the clay includes bentonite.

In at least one implementation, the clay includes calcined kaolin clay.

In at least one implementation, the coloring agent includes one or more of a dye, a pigment, or combinations thereof.

In at least one implementation, the coloring agent may include the pigment.

In at least one implementation, the pigment may include a blue pigment.

In at least one implementation, the whitening agents may include the metal oxide, the clay, and the coloring agent.

In at least one implementation, the solid cleansing composition may have a whiteness, as measured via a Hunter Whiteness Index (L) of from about 80 to about 90.

In at least one implementation, the solid cleansing composition may have a refractive index of from about 1.0 to about 3.0.

The foregoing and/or other aspects and utilities embodied in the present disclosure may be achieved by providing a method for preparing the solid cleansing composition disclosed herein. The method may include contacting the cleansing component and the one or more whitening agents with one another.

The foregoing and/or other aspects and utilities embodied in the present disclosure may be achieved by providing a method for treating, preventing, or inhibiting damage to skin. The method may include contacting any one or more of the solid cleansing components disclosed herein with the skin.

In at least one implementation, the solid cleansing composition prevents lipid peroxidation of the skin.

The foregoing and/or other aspects and utilities embodied in the present disclosure may be achieved by providing a method for preventing antibacterial growth on skin. The method may include contacting any solid cleansing composition disclosed herein with the skin.

In at least one implementation, the antibacterial growth includes *E. coli* growth.

In at least one implementation, the antibacterial growth includes *S. aureus* growth.

Further areas of applicability of the present disclosure will become apparent from the detailed description provided hereinafter. It should be understood that the detailed description and specific examples, while indicating some typical aspects of the disclosure, are intended for purposes of illustration only and are not intended to limit the scope of the disclosure.

DETAILED DESCRIPTION

The following description of various typical aspect(s) is merely exemplary in nature and is in no way intended to limit the disclosure, its application, or uses.

As used throughout this disclosure, ranges are used as shorthand for describing each and every value that is within the range. It should be appreciated and understood that the description in a range format is merely for convenience and brevity, and should not be construed as an inflexible limitation on the scope of any embodiments or implementations disclosed herein. Accordingly, the disclosed range should be construed to have specifically disclosed all the possible subranges as well as individual numerical values within that range. As such, any value within the range may be selected as the terminus of the range. For example, description of a range such as from 1 to 5 should be considered to have specifically disclosed subranges such as from 1.5 to 3, from 1 to 4.5, from 2 to 5, from 3.1 to 5, etc., as well as individual numbers within that range, for example, 1, 2, 3, 3.2, 4, 5, etc. This applies regardless of the breadth of the range.

Unless otherwise specified, all percentages and amounts expressed herein and elsewhere in the specification should be understood to refer to percentages by weight. The amounts given are based on the active weight of the material.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

As used herein, "free" or "substantially free" of a material may refer to a composition, component, or phase where the material is present in an amount of less than 10.0 weight %, less than 5.0 weight %, less than 3.0 weight %, less than 1.0 weight %, less than 0.1 weight %, less than 0.05 weight %, less than 0.01 weight %, less than 0.005 weight %, or less than 0.0001 weight % based on a total weight of the composition, component, or phase.

As used herein, the term "effective" may refer to an amount of a subject active or respective amounts of a combination of actives sufficient to provide a significantly positive modification of the condition to be treated. It should be appreciated that the effective amount of the subject active or combination of actives may vary with the particular condition being treated, the severity of the condition, the duration of the treatment, the nature of concurrent treatment(s), like factors, or combinations thereof.

All references cited herein are hereby incorporated by reference in their entireties. In the event of a conflict in a definition in the present disclosure and that of a cited reference, the present disclosure controls.

The present inventors have surprisingly and unexpectedly discovered that solid cleansing compositions, such as bar soaps, including a combination of clay and ZnO as the whitening agents provided whiteness comparable to solid cleansing compositions including titanium dioxide as the whitening agent. Particularly, the present inventors have surprisingly and unexpectedly discovered that solid cleansing compositions including a combination of kaolin clay and ZnO as the whitening agent was an effective and sufficient replacement for titanium dioxide.

The present inventors have also surprisingly and unexpectedly discovered that solid cleansing compositions, such as bar soaps, including a combination of clay, ZnO, and a coloring agent as the whitening agents provided whiteness comparable to solid cleansing compositions including titanium dioxide as the whitening agent. Particularly, the present inventors have surprisingly and unexpectedly discovered that solid cleansing compositions including a combination of bentonite clay, ZnO, and pigment blue as the whitening agent was an effective and sufficient replacement for titanium dioxide.

Compositions

Compositions disclosed herein may be or include solid cleansing compositions. Illustrative solid cleansing compositions may be or include, but are not limited to, soap bars, cleansing bars, and other solid cleansing compositions that may be used for personal cleansing or as a laundry bar. As used herein, the term "soap bar" or "bar soap" may refer to solid or semi-solid articles for washing, bathing, and cleaning that include soap surfactants, synthetic surfactants, or mixtures thereof. Illustrative soap bars may be or include, but are not limited to, laundry bars, syndet bars, detergent bars, combo bars (combars), fatty acid soap bars, tallow base soap bars, veggie soap bars, or the like.

The solid cleansing compositions may include a cleansing component (e.g., soaps and/or synthetic surfactants) and one or more whitening agents. As further discussed herein, each of the one or more whitening agents may be present in the solid cleansing composition an effective amount sufficient to provide the solid cleansing composition attributes comparable to or greater than (e.g., significantly greater than) conventional solid cleansing compositions excluding the one or more whitening agents. For example, each of the one or more whitening agents may be present in the solid cleansing composition in an amount sufficient to provide improved (e.g., significantly greater than) or comparable (e.g., parity) whiteness, UV protection, and/or antibacterial properties than conventional personal care compositions excluding the one or more whitening agents. Each of the one or more whitening agents may also be present in the solid cleansing composition in an effective amount sufficient to provide the solid cleansing composition attributes comparable to or greater than (e.g., significantly greater than) conventional solid cleansing compositions including titanium dioxide as the whitening agent. For example, each of the one or more whitening agents may be present in the solid cleansing composition in an amount sufficient to provide improved (e.g., significantly greater than) or comparable (e.g., parity) whiteness, UV protection, and/or antibacterial properties than conventional personal care compositions including titanium dioxide as the whitening agent.

The solid cleansing compositions disclosed herein have comparable or improved whiteness (e.g., L* value) as compared to conventional solid cleansing compositions incorporating titanium dioxide. In at least one implementation, the whiteness may be measured on a scale of from 0 to 100, as defined by the Commission Internationale de l'Eclairage (CIE), where 100 represents absolute whiteness. Whiteness may be determined by comparing UV emissions at a wavelength of from about 420 nm to about 720 nm, and may be assessed on color scales, such as the Hunter L, a, b, and the CIE L*, a*, b* scales. In another implementation, the whiteness may be measured via a refractive index.

The solid cleansing compositions disclosed herein may have a whiteness, as measured via a Hunter whiteness index (L), of from about 60 to about 90. For example, the solid cleansing compositions disclosed herein may have a Hunter whiteness index of from about 60, about 65, about 70, about 75 or about 85 to about 90. In another example, the solid cleansing composition disclosed herein may have a Hunter whiteness index (L) of greater than or equal to 70, greater than or equal to 75, greater than or equal to 80, greater than or equal to 82, greater than or equal to 84, greater than or equal to 86, or greater than or equal to 88.

The solid cleansing compositions disclosed herein may have a whiteness, as measured via a refractive index, of from about 1.0 to about 3.0. For example, the solid cleansing composition disclosed herein may have a refractive index of from about 1.0, about 1.2, about 1.4, about 1.6, about 1.8, or about 2.0 to about 2.2, about 2.4, about 2.6, about 2.8, or about 2.9. In another example, the solid cleansing composition may have a refractive index of greater than or equal to 1.0, greater than or equal to 1.5, greater than or equal to 1.8, greater than or equal to 2.2, greater than or equal to 2.4, greater than or equal to 2.6, greater than or equal to 2.8. In another example, the solid cleansing composition may have a refractive index of from about 1.0 to about 3.0, about 1.1 to about 2.4, about 1.2 to about 2.3, about 1.3 to about 2.2, about 1.4 to about 2.1, about 1.5 to about 2.0, about 1.5 to about 1.9, about 1.5 to about 1.8, about 1.5 to about 1.7, or about 1.5 to about 1.6.

The solid cleansing composition may include one or more whitening agents capable of or configured to improve a color and/or whiteness of the solid cleansing composition (e.g., bar soap). The whitening agents may be or include, but are not limited to one or more metal oxides, such as metal oxide powders or slurries thereof, one or more clays, one or more coloring agents, or the like, or combinations thereof.

The one or more metal oxides may be or include, but are not limited to, zinc oxide (ZnO), titanium dioxide ($TiO_2$), or combinations thereof. In at least one implementation, the solid cleansing composition may be free or substantially free of titanium dioxide.

The one or more metal oxides may be sized or have a mean particle size effective to provide UV protection (UVA and UVB protection) to skin and/or provide antibacterial efficacy on skin. The one or more metal oxides may be sized or have a mean particle size effective to provide antibacterial efficacy on skin. The one or more metal oxides may also be sized or have a mean particle size effective to provide sufficient whiteness to the solid cleansing composition. For example, the one or more metal oxides may have a mean particle size of from about 10 nm to about 10 μm, about 10 nm to about 200 nm, about 30 to about 150 nm, or about 60 to about 100 nm.

The one or more metal oxides may be present in an amount effective to provide UV protection (UVA and UVB protection) to skin and/or provide antibacterial efficacy on skin. The one or more metal oxides may be present in an amount effective to provide antibacterial efficacy on skin. The one or more metal oxides may also be present in an amount effective to provide sufficient whiteness to the solid cleansing composition. For example, the one or more metal oxides may be present in an amount of from about 0.1 wt % to about 70 wt %, based on the total weight of the solid cleansing composition. For example, the one or more metal oxides may be present in an amount of from about 0.1 wt %, about 0.2 wt %, about 0.25 wt %, about 0.3 wt %, about 0.4 wt %, about 0.5 wt %, about 0.6 wt %, about 0.7 wt %, about 0.8 wt %, about 0.9 wt %, about 1.0 wt %, about 1.5 wt %, about 2.0 wt %, about 3.0 wt %, about 4.0 wt %, about 5.0 wt %, or about 6.0 wt % to about 7.0 wt %, about 8.0 wt %, about 9.0 wt %, about 10.0 wt %, about 11.0 wt %, about 12.0 wt %, about 13.0 wt %, about 14.0 wt %, or about 15.0 wt %, based on the total weight of the solid cleansing composition. In another example, the one or more metal oxides may be present in an amount greater than or equal to about 0.1 wt % to less than or equal to about 0.15 wt %, less than or equal to about 0.2 wt %, less than or equal to about 0.25 wt %, less than or equal to about 0.3 wt %, less than or equal to about 0.4 wt %, less than or equal to about 0.5 wt %, less than or equal to about 0.6 wt %, less than or equal to about 0.7 wt %, less than or equal to about 0.8 wt %, less than or equal to about 0.9 wt %, less than or equal to about 1.0 wt %, less than or equal to about 1.5 wt %, less than or equal to about 2.0 wt %, less than or equal to about 3.0 wt %, less than or equal to about 4.0 wt %, less than or equal to about 5.0 wt %, less than or equal to about 6.0 wt %, less than or equal to about 7.0 wt %, less than or equal to about 8.0 wt %, less than or equal to about 9.0 wt %, less than or equal to about 10.0 wt %, less than or equal to about 11.0 wt %, less than or equal to about 12.0 wt %, less than or equal to about 13.0 wt %, less than or equal to about 14.0 wt %, or less than or equal to about 15.0 wt %, less than or equal to about 40 wt %, less than or equal to about 50 wt %, less than or equal to about 60 wt %, less than or equal to about 70 wt %, based on the total weight of the solid cleansing composition.

The one or more clays may be or include, but are not limited to, bentonite, kaolin, kaolinite, calcined kaolin, metakaolin, hydrous kandite clay, halloysite or ball clay, smectite, illite, chlorite, hormite, beidelite, sepiolite, alunite, hydrotalcite, nontronite, hectorite, attapulgite, pimelite, muscovite, willemseite, minnesotaite, antigorite, amesite, china clay, halloysite, or the like, or combinations thereof.

Bentonites may be or include clays that are comprised primarily of, and whose properties are typically dictated by, a smectite clay mineral (e.g., montmorillonite, hectorite, nontronite, etc.). Smectites are generally comprised of stacks of negatively charged layers balanced and/or compensated by alkaline earth metal cations (e.g., $Ca^{2+}$ and/or $Mg^{2+}$) and/or alkali metal cations (e.g., $Na^+$ and/or $K^+$). Each of the charged layers of the smectites is comprised of two tetrahedral sheets attached to one octahedral sheet; the tetrahedra formed by silicon and oxygen atoms and the octahedra formed by aluminum and oxygen atoms together with hydroxyl radicals. The relative amounts of the two types of cations, namely the alkaline earth metal and alkali metal, typically determine the swelling characteristic of the clay material when placed in water. Bentonites, in which the alkaline earth metal cation $Ca^{2+}$ is predominant (e.g., relative majority), are called calcium bentonites; whereas, bentonites in which the alkali metal cation $Na^+$ is predominant (e.g., relative majority) are called sodium bentonites.

The term "natural," as used herein with respect to clay material, refers to the presence of the mineral in deposits found in the earth (e.g., formed via modification of volcanic ash deposits in marine basins by geological processes). Accordingly, a natural deposit of bentonite containing primarily or a relative majority of $Na^+$ cations is referred to as "natural sodium bentonite;" whereas, a natural deposit of a bentonite predominantly containing or containing a relative majority of $Ca^{2+}$ cations is referred to as "natural calcium bentonite."

Synthetic analogues of Na and Ca bentonite may also be synthesized, for example, via hydrothermal techniques. "Synthetic sodium bentonite" may also refer to bentonite obtained by treatment of calcium bentonite with, but not limited to, sodium carbonate or sodium oxalate, to remove the calcium ion and substitute it with a sodium ion. This treatment may be varied to impart varying levels of ion-exchange or $Na^+$ for $Ca^{2+}$ substitution. In at least one implementation, the calcium bentonite may be converted into synthetic sodium bentonite to impart greater swelling properties to otherwise relatively the non-swelling calcium bentonite. There is also an aesthetic benefit associated with synthetic sodium bentonite that is lacking in natural sodium bentonite. Natural sodium bentonite is generally colored. The color may often vary from brown to yellow to gray. By comparison, natural calcium bentonite has a more aesthetically pleasing white color. Consequently, synthetic sodium bentonite that is obtained by treatment of this white calcium bentonite is also white. In at least one preferred implementation, the clay of the solid cleansing composition includes natural calcium bentonite, synthetic sodium bentonite (e.g., calcium ion substituted), or combinations thereof.

The one or more clays may be present in an amount effective to provide UV protection (UVA and UVB protection) to skin and/or provide antibacterial efficacy on skin. The one or more clays may also be present in an amount effective to provide sufficient whiteness to the solid cleansing composition. For example, the one or more clays may be present in an amount of from about 0.1 wt % to about 15 wt %, based on the total weight of the solid cleansing composition. For example, the one or more clays may be present in an amount of from about 0.1 wt %, about 0.2 wt %, about 0.25 wt %, about 0.3 wt %, about 0.4 wt %, about 0.5 wt %, about 0.6 wt %, about 0.7 wt %, about 0.8 wt %, about 0.9 wt %, about 1.0 wt %, about 1.5 wt %, about 2.0 wt %, about 3.0 wt %, about 4.0 wt %, about 5.0 wt %, or about 6.0 wt % to about 7.0 wt %, about 8.0 wt %, about 9.0 wt %, about 10.0 wt %, about 11.0 wt %, about 12.0 wt %, about 13.0 wt %, about 14.0 wt %, or about 15.0 wt %, based on the total weight of the solid cleansing composition. In another example, the one or more clays may be present in an amount greater than or equal to about 0.1 wt % to less than or equal to about 0.15 wt %, less than or equal to about 0.2 wt %, less than or equal to about 0.25 wt %, less than or equal to about 0.3 wt %, less than or equal to about 0.4 wt %, less than or equal to about 0.5 wt %, less than or equal to about 0.6 wt %, less than or equal to about 0.7 wt %, less than or equal to about 0.8 wt %, less than or equal to about 0.9 wt %, less than or equal to about 1.0 wt %, less than or equal to about 1.5 wt %, less than or equal to about 2.0 wt %, less than or equal to about 3.0 wt %, less than or equal to about 4.0 wt %, less than or equal to about 5.0 wt %, less than or equal to about 6.0 wt %, less than or equal to about 7.0 wt %, less than or equal to about 8.0 wt %, less than or equal to about 9.0 wt %, less than or equal to about 10.0 wt %, less than or equal to about 11.0 wt %, less than or equal to about 12.0 wt %, less than or equal to about 13.0 wt %, less than or equal to about 14.0 wt %, or less than or equal to about 15.0 wt %, based on the total weight of the solid cleansing composition.

The one or more coloring agents may be or include, but are not limited to, one or more dyes, one or more pigments, or combinations thereof. In a preferred implementation, the coloring agents include one or more pigments. The pigments may be organic and/or inorganic pigments. Particularly, the pigments may be or include one or more blue pigments. Illustrative pigments may be or include, but are not limited to, Micranyl® Q, C.I. Pigment Blue 29, such as Micranyl® Blue 6250 Q (Ultramarine blue), Micranyl® Blue 6255 Q (Ultramarine blue), Micranyl® Blue 6911 Q (Cu-phthalocyanine), Micranyl® Blue 7090 Q (Cu-phthalocyanine), all of which are commercially available from BASF of Florham Park, NJ.

The one or more coloring agents may be present in an amount effective to provide sufficient whiteness to the solid cleansing composition. For example, the one or more coloring agents may be present in an amount of from about 0.00005 wt % to about 1 wt %, based on the total weight of the solid cleansing composition. For example, the one or more coloring agents may be present in an amount of from about 0.00005 wt %, about 0.00007 wt %, about 0.00008 wt %, about 0.0001 wt %, about 0.00015 wt %, about 0.0002 wt %, about 0.0003 wt %, about 0.0004 wt %, about 0.0005 wt %, about 0.0006 wt %, about 0.0007 wt %, about 0.0008 wt %, about 0.0009 wt %, or about 0.001 wt % to about 0.002 wt %, about 0.003 wt %, about 0.004 wt %, about 0.005 wt %, about 0.006 wt %, about 0.007 wt %, about 0.008 wt %, about 0.009 wt %, about 0.01 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1.0 wt %, based on the total weight of the solid cleansing composition. In another example, the one or more coloring agents may be present in an amount of from greater than or equal to less than or equal to about 0.00005 wt %, less than or equal to about 0.00007 wt %, less than or equal to about 0.00008 wt %, less than or equal to about 0.0001 wt %, less than or equal to about 0.00015 wt %, less than or equal to about 0.0002 wt %, less than or equal to about 0.0003 wt %, less than or equal to about 0.0004 wt %, less than or equal to about 0.0005 wt %, less than or equal to about 0.0006 wt %, less than or equal to about 0.0007 wt %, less than or equal to about 0.0008 wt %, less than or equal to about 0.0009 wt %, less than or equal to about 0.001 wt %, less than or equal to about 0.002 wt %, less than or equal to about 0.003 wt %, less than or equal to about 0.004 wt %, less than or equal to about 0.005 wt %, less than or equal to about 0.006 wt %, less than or equal to about 0.007 wt %, less than or equal to about 0.008 wt %, less than or equal to about 0.009 wt %, less than or equal to about 0.01 wt %, less than or equal to about 0.1 wt %, less than or equal to about 0.2 wt %, less than or equal to about 0.3 wt %, a less than or equal to bout 0.4 wt %, less than or equal to about 0.5 wt %, less than or equal to about 0.6 wt %, less than or equal to about 0.7 wt %, less than or equal to about 0.8 wt %, less than or equal to about 0.9 wt %, less than or equal to about 1.0 wt %, based on the total weight of the solid cleansing composition.

In at least one implementation, the solid cleansing composition or the whitening agents thereof may exclude, be free, or substantially free of any one or more of the following: starch and/or mineral oil, rice flour, pealescent, hydroxyethyl stearate, calcium pyrophosphate, bismuth oxychloride, aluminum hydroxide, sodium stearate, calcium carbonate, magnesium carbonate, barium sulfate, or combinations thereof.

As discussed above, the solid cleansing composition may include one or more whitening agents. For example, the solid cleansing composition may include a single whitening agent or a combination of whitening agents. When a combination of whitening agents are present, a first whitening agent and a second whitening agent may be present in a weight ratio of from about 0.1:1 to about 15:1. For example, the first whitening agent and the second whitening agent may be present in an amount of about 0.1:1, about 0.2:1, about 0.3:1, about 0.4:1, about 0.5:1, about 0.6:1, about 0.7:1, about 0.8:1, about 0.9:1, about 1:1, about 1.1:1, about 1.2:1, about 1.3:1, about 1.4:1, about 1.5:1, about 1.6:1, about 1.7:1, about 1.8:1, about 1.9:1, about 2:1, about 2.5:1, about 3:1, about 3.5:1, about 4:1, about 4.5:1, about 5:1, about 6:1, about 7:1, about 8:1, about 9:1, about 10:1, about 11:1, about 12:1, about 13:1, about 14:1, or about 15:1. In another example, the first whitening agent and the second whitening agent may be present in an amount of from about 0.1:1, about 0.2:1, about 0.3:1, about 0.4:1, about 0.5:1, about 0.6:1, about 0.7:1, about 0.8:1, about 0.9:1, or about 1:1 to about 1.1:1, about 1.2:1, about 1.3:1, about 1.4:1, about 1.5:1, about 1.6:1, about 1.7:1, about 1.8:1, about 1.9:1, about 2:1, about 2.5:1, about 3:1, about 3.5:1, about 4:1, about 4.5:1, about 5:1, about 6:1, about 7:1, about 8:1, about 9:1, about 10:1, about 11:1, about 12:1, about 13:1, about 14:1, or about 15:1.

In at least one implementation, the whitening agents of the solid cleansing composition includes a combination of kaolin clay and zinc oxide (ZnO). For example, the whitening agent of the solid cleansing composition includes calcined kaolin clay and ZnO. The calcined kaolin clay may be present in an amount of from about 1.5 wt % to about 3.5 wt %, preferably about 2 wt % to about 3 wt %, more preferably about 2.5 wt %, based on the total weight of the solid cleansing composition. The ZnO may be present in an amount of from about 0.1 wt % to about 1 wt %, about 0.2 wt % to about 0.8 wt %, about 0.3 wt % to about 0.7 wt %, about 0.4 wt % to about 0.6 wt %, or preferably about 0.5 wt %, based on the total weight of the solid cleansing composition.

In another implementation, the whitening agents of the solid cleansing composition may include bentonite clay, zinc oxide (ZnO), one or more coloring agents, or combinations thereof. For example, the whitening agent of the solid cleansing composition includes a combination of bentonite clay, ZnO, and at least one blue pigment. The bentonite clay may be present in an amount of from about 0.1 wt % to about 3 wt %, about 0.5 wt % to about 2.5 wt %, about 0.8 wt % to about 2.2 wt %, about 1 wt % to about 2 wt %, or about 1.5 wt %, based on the total weight of the solid cleansing composition. The ZnO may be present in an amount of from about 0.1 wt % to about 3 wt %, about 0.5 wt % to about 2.5 wt %, about 0.8 wt % to about 2.2 wt %, about 1 wt % to about 2 wt %, or about 1.5 wt %, based on the total weight of the solid cleansing composition. The bentonite and the ZnO may be present in a weight ratio of from about 0.5:1, about 0.6:1, about 0.7:1, about 0.8:1, about 0.9:1, about 1:1, about 1.1:1, about 1.2:1, about 1.3:1, about 1.4:1, or about 1.5:1. For example, the bentonite and the ZnO may be present in a weight ratio of from about 0.5:1 to about 1.5:1, about 0.8:1 to about 1.3:1, about 0.9:1 to about 1.2:1, or about 1:1. The at least one blue pigment may be present in an amount of from about 0.0001 wt % to about 0.0005 wt %, about 0.0001 wt % to about 0.0004 wt %, about 0.0001 wt % to about 0.0003 wt %, or about 0.0002 wt %, based on the total weight of the solid cleansing composition.

The compositions disclosed herein may have a natural origin index of greater than about 80%. As used herein, the term or expression “natural origin index” may refer to a value (e.g., a percentage) or degree of a substance (e.g., a product or a composition thereof) that describes the natural content of ingredients or formulation of the substance. The natural origin index may be determined by the ISO 16128-2:2017 standard of the International Organization for Standardization (ISO). In at least one example, the natural origin index of the personal care compositions disclosed herein may be greater than 80%, greater than 85%, greater than 90%, greater than 95%, greater than 96%, greater than 97%, greater than 98%, greater than 99%, greater than 99.5%, or 100%.

The solid cleansing composition may include at least one cleansing component. The cleansing component may include one or more soaps (e.g., soap surfactants), one or more synthetic surfactants, or combinations thereof. In at least one implementation, the cleansing component of the solid cleansing composition may include one or more synthetic surfactants in combination with or in place of the soap surfactants. Solid cleansing compositions including only the one or more synthetic surfactants may be referred to as syndet bars or may be referred to as solid cleansing compositions having a syndet base. Solid cleansing compositions including the one or more synthetic surfactants and the soap surfactants may be referred to as combo bars (combars) or may be referred to as solid cleansing compositions having a combination soap base.

The soap or soap surfactants may be or include alkali metal or alkanol ammonium salts of aliphatic alkane- or alkene-monocarboxylic acids, including about 6 to about 22 carbon atoms, about 6 to about 18 carbon atoms, about 12 to about 18 carbon atoms, or about 12 to about 22 carbon atoms. Illustrative soaps that may be utilized in the solid cleansing composition may be or include, but are not limited to, sodium soaps, ammonium soaps, potassium soaps, magnesium soaps, calcium soaps, mono-, di-, and tri-ethanol ammonium cation soaps, or the like, or mixtures thereof. In a preferred implementation, the cleansing component or soap includes a sodium soap; however, it should be appreciated that at least a portion of the soap may also include one or more ammonium soaps, potassium soaps, magnesium soaps, calcium soaps, or the like, or mixtures and combinations thereof. In a preferred implementation, the cleansing component or the soap may be or include, but is not limited to, alkali metal salts of aliphatic (alkanoic or alkenoic) acids having about 8 to about 22 carbon atoms or about 10 to about 20 carbon atoms.

The cleansing component or the soap thereof may be a fatty acid soap. The fatty acid soap may include one or more neutralized fatty acids. Illustrative fatty acids used for the fatty acid soap may be or include, but are not limited to, myristic acid, lauric acid, palmitic acid, oleic acid, stearic acids, or the like, or combinations thereof. Sources of fatty acids may include coconut oil, palm oil, grape seed oil, palm kernel oil, tallow, avocado, canola, corn, cottonseed, olive, hi-oleic sunflower, mid-oleic sunflower, sunflower, palm stearin, palm kernel olein, safflower, babassu oils, or combinations thereof.

The fatty acids may be neutralized with any base to form the soap or fatty acid soap. Illustrative bases may be or include, but are not limited to, sodium hydroxide, potassium hydroxide, triethanolamine, or the like, or mixtures and combinations thereof. In certain implementations, the fatty acid soap may be formed from fatty acids neutralized by two or more bases. In certain embodiments, the bases are sodium hydroxide and triethanolamine. In certain implementations, the molar ratio of sodium hydroxide and triethanolamine is 1:1. In certain implementations, the fatty acids may be or include any one or more of oleic acid, palmitic acid, stearic acid, lauric acid, or combinations thereof. For example, the fatty acid soap may be or include sodium palmitate, sodium oleate, sodium laurate, sodium stearate, or any combination or mixture thereof. In at least one implementation, the fatty acid soap may further include glycerin.

In at least one implementation, the cleansing component or the soap thereof may include soaps having the fatty acid distribution of tallow and/or one or more vegetable oils (e.g., “fatty acid soaps”). The vegetable oil may be or include, but is not limited to, palm oil, palm kernel oil, palm kernel olein, palm stearin oil, palm kernel olein oil, coconut oil, avocado oil, canola oil, corn oil, cottonseed oil, olive oil, high-oleic sunflower oil, mid-oleic sunflower oil, sunflower oil, safflower oil, babassu oil, sweet almond oil, castor oil, canola oil, soybean oil, olive oil, acai oil, andiroba oil, apricot kernel oil, argan oil, passion fruit oil, marula oil, mango oil, shea oil, macadamia nut oil, brazil nut oil, borage oil, copaiba oil, grape seed oil, buriti oil, sesame oil, flaxseed oil or linseed oil, blueberry oil, cranberry oil, blackberry oil, plum oil, raspberry oil, camelina oil, camellia oil, walnut oil, wheat germ oil, calendula oil, cherry kernel oil, cucumber seed oil, papaya oil, aloe vera oil, hemp oil, or the like, or mixtures or combinations thereof.

In at least one implementation, the cleansing component or the soap thereof may include a mixture or blend of about 60 wt % to about 80 wt % $C_{16}$-$C_{18}$ fatty acids and about 20 wt % to about 40 wt % $C_{12}$-$C_{14}$ fatty acids, based on the cleansing component or the soap thereof. The $C_{16}$-$C_{18}$ fatty acids may be obtained from tallow and the $C_{12}$-$C_{14}$ fatty acids may be obtained from one or more vegetable oils, such as lauric oils, palm kernel oils, coconut oils, or combinations thereof. In some example, the cleansing component or the soap thereof may be or include a mixture or blend of about 60 wt % to about 80 wt %, or about 65% to about 75%, or about 70% $C_{16}$-$C_{18}$ fatty acids, and about 20 wt % to about 40 wt %, about 25% to about 35%, or about 30% $C_{12}$-$C_{14}$ fatty acids, based on the total weight of the cleansing component or the soap thereof.

The cleansing component or the soap thereof may be produced by conventional methods where natural fats and oils such as tallow and/or vegetable oils or their equivalents are saponified with an alkali metal hydroxide using procedures known to those skilled in the art. Alternatively, the cleansing component or the soap thereof may be produced by neutralizing one or more fatty acids, such as lauric, myristic, palmitic, or stearic acids with alkali metal hydroxide or carbonate.

The amount or concentration of any one or more of the soaps (e.g., soap surfactant, fatty acid soap) in the cleansing component may vary widely. In at least one implementation, the amount of any one or more of the soaps in the cleansing component may be greater than or equal to 40 weight % and less than or equal to 95 weight %. For example, the amount of any one or more of the soaps in the cleansing component may be from about 40 weight %, about 50 weight %, about 55 weight %, about 60 weight %, about 65 weight %, or about 70 weight % to about 75 weight %, about 80 weight %, about 85 weight %, about 90 weight %, or about 95 weight %. In another implementation, the amount of any one or more of the soaps in the cleansing component is greater than 70 weight % and less than 80 weight %. For example, the amount of any one or more of the soaps in the cleansing component may be from about 70 weight %, about 71 weight %, about 72 weight %, about 73 weight %, about 74 weight %, or about 75 weight % to about 76 weight %, about 77 weight %, about 78 weight %, about 79 weight %, or about 80 weight %.

Illustrative synthetic surfactants as utilized in syndet bases and combo bars may be or include, but are not limited to, anionic surfactants, amphoteric surfactants, nonionic surfactants, zwitterionic surfactants, and cationic surfactants. In at least one implementation, any one or more of the synthetic surfactants may be present in the solid cleansing composition or the cleansing component thereof in an amount of from greater than or equal to about 50 wt % to about 99 wt %, preferably from about 60 wt % to about 95 wt %, and more preferably from about 70 wt % to about 90 wt %, based on the total weight of the solid cleansing composition of the cleansing component thereof. In another implementation, any one or more of the synthetic surfactants may be present in the solid cleansing composition or the cleansing component thereof in an amount of from about 8.0 wt % to about 65.0 wt %, preferably from about 10.0 wt % to about 60.0 wt %, and more preferably from about 10.0 wt % to about 50.0 wt %, based on the total weight of the solid cleansing composition of the cleansing component thereof.

Illustrative anionic surfactants may be or include, but are not limited to, alkyl sulfates, anionic acyl sarcosinates, methyl acyl taurates, N-acyl glutamates, acyl isethionates, alkyl ether sulfates, alkyl sulfosuccinates, alkyl phosphate esters, ethoxylated alkyl phosphate esters, trideceth sulfates, protein condensates, mixtures of ethoxylated alkyl sulfates, or the like, or combinations thereof. Alkyl chains for these surfactants are $C_8$-$C_{22}$, preferably $C_{10}$-$C_{18}$ and, more preferably, $C_{12}$-$C_{14}$ alkyls.

The zwitterionic surfactants may include those which can be broadly described as derivatives of aliphatic quaternary ammonium, phosphonium, and sulfonium compounds, in which the aliphatic radicals may be straight chain or branched, and where one of the aliphatic substituents may contain from about 8 to about 18 carbon atoms and one contains an anionic water-solubilizing group, for example, carboxy, sulfonate, sulfate, phosphate, or phosphonate. Illustrative zwitterionic surfactants may be or include, but are not limited to, 4-[N,N-di(2-hydroxyethyl)-N-octadecylammonio]-butane-1-carboxylate; 5-[S-3-hydroxypropyl-S-hexadecylsulfonio]-3 hydroxypentane-1-sulfate; 3-[P,P—P-diethyl-P 3,6,9 trioxatetradecyl-phosphonio]-2-hydroxypropane-1-phosphate; 3-[N,N-dipropyl-N-3-dodecoxy-2-hydroxypropylammonio]-propane-1-phosphonate; 3-(N,N-di-methyl-N-hexadecylammonio) propane-1-sulfonate; 3-(N,N-dimethyl-N-hexadecylammonio)-2-hydroxypropane-1-sulfonate; 4-(N,N-di(2-hydroxyethyl)-N-(2 hydroxydodecyl)ammonio]-butane-1-carboxylate; 3-[S-ethyl-S-(3-dodecoxy-2-hydroxypropyl)sulfonio]-propane-1-phosphate; 3-(P,P-dimethyl-P-dodecylphosphonio)-propane-1-phosphonate; 5-[N,N-di(3-hydroxypropyl)-N-hexadecylammonio]-2-hydroxy-pentane-1-sulfate; or the like, or combinations thereof.

The amphoteric surfactants may include those which can be broadly described as derivatives of aliphatic secondary and tertiary amines in which the aliphatic radical may be straight chain or branched and where one of the aliphatic substituents may contain from about 8 to about 18 carbon atoms and one contains an anionic water solubilizing group, e.g., carboxy, sulfonate, sulfate, phosphate, or phosphonate. Illustrative amphoteric surfactant may be or include, but are not limited to, sodium 3-dodecylaminopropionate, sodium 3-dodecylaminopropane sulfonate; N-alkyltaurines, such as the one prepared by reacting dodecylamine with sodium isethionate according to U.S. Pat. No. 2,658,072; N-higher alkyl aspartic acids, such as those produced according to U.S. Pat. No. 2,438,091; and the products sold under the trade name “MIRANOL” and described in U.S. Pat. No. 2,528,378, or the like, or combinations thereof. Other illustrative amphoteric surfactants may be or include, but are not limited to, betaines. The betaines, may be or include, but are not limited to, the high alkyl betaines, such as coco dimethyl carboxymethyl betaine, lauryl dimethyl carboxy-methyl betaine, lauryl dimethyl alpha-carboxyethyl betaine, cetyl dimethyl carboxymethyl betaine, lauryl bis-(2-hydroxyethyl)carboxy methyl betaine, stearyl bis-(2-hydroxypropyl) carboxymethyl betaine, oleyl dimethyl gamma-carboxypropyl betaine, lauryl bis-(2-hydro-xypropyl)alpha-carboxyethyl betaine, etc. The sulfobetaines may be represented by coco dimethyl sulfopropyl betaine, stearyl dimethyl sulfopropyl betaine, amido betaines, amidosulfobetaines, or the like, or combinations thereof.

Illustrative cationic surfactants may be or include, but are not limited to, stearyldimenthylbenzyl ammonium chloride; dodecyltrimethylammonium chloride; nonylbenzylethyldimethyl ammonium nitrate; tetradecylpyridinium bromide; laurylpyridinium chloride; cetylpyridinium chloride; laurylpyridinium chloride; laurylisoquinolium bromide; ditallow(Hydrogenated)dimethyl ammonium chloride; dilauryldimethyl ammonium chloride; stearalkonium chloride; or other cationic surfactants known in the art, or combinations thereof.

The nonionic surfactants may include those broadly defined as compounds produced by the condensation of alkylene oxide groups (hydrophilic in nature) with an organic hydrophobic compound, which may be aliphatic or alkyl aromatic in nature.

In a preferred implementation, the synthetic surfactants of the cleansing component may include sodium cocoyl isethionate, disodium lauryl sulfosuccinate, or combinations thereof.

The solid cleansing composition and the cleansing component thereof may include water. Water of the solid cleansing composition and the cleansing component thereof may be deionized water, demineralized water, and/or softened water. Water of the cleansing component may be separate from the water of other components of the solid cleansing composition. For example, water of the soap and/or the synthetic surfactants may be separate from water in other components of the solid cleansing composition. Water may make up the balance of the solid cleansing composition. For example, the amount of water in the solid cleansing composition may be from about 1 weight % to about 10 weight %, about 10 weight % to about 20 weight %, about 12 weight % to about 18 weight %, or about 14 weight % to about 16 weight %. In another example, the amount of water in the solid cleansing composition may be at least 10 weight %, at least 11 weight %, at least 12 weight %, at least 13 weight %, at least 14 weight %, at least 15 weight %, at least 16 weight %, or at least 17 weight %. In at least one implementation, the amount of water may be about 10 weight %, about 11 weight %, about 12 weight %, about 13 weight %, about 14 weight %, or about 15 weight %. The amount of water in the solid cleansing composition may include free water added and/or water introduced with other components or materials of the solid cleansing composition. For example, the amount of water in the solid cleansing composition may include free water and water associated with the soap, the synthetic surfactant, and/or any other component of the solid cleansing composition.

The solid cleansing composition may include one or more humectants. Illustrative humectants may include, but are not limited to, one or more of ascorbic acid, ascorbyl dipalmitate, acetamide MEA or acetamide monoethanolamine, glucose glutamate, glucuronic acid, triethanolamine salt of lactic acid (TEA-lactate), pyroglutamic acid triethanolamine salt (TEA-PCA), corn syrup, fructose, glucose, glycerin, glycol, 1,2,6-hexanetriol, sodium lactate, sodium salt of pyroglutamic acid (sodium PCA), hydrogenated starch hydrolysate, inositol, lactic acid, lactose, mannitol, pyroglutamic acid (PCA), PEG-10 propylene glycol, polyamino sugar condensate, propylene glycol, pyridoxine dilaurate, saccharide hydrolysate, hydroxystearyl methylglucamine, glucamine, maltitol, mannitol, methyl gluceth-10, methyl gluceth-20, riboflavin, PEG-4, PEG-6, PEG-8, PEG-9, PEG-10, PEG-12, PEG-14, PEG-16, PEG-18, PEG-20, PEG-32, PEG-40, where PEG are polymers of ethylene glycol, glutamic acid, glycereth-7, glycereth-12, glycereth-26, saccharide isomerate, sorbeth-20, sorbitol, sucrose, thioglycerin, tris-(hydroxymethyl)nitromethane, tromethamine, histidine, PEG-75, PEG-135, PEG-150, PEG-200, PEG-5 pentaerythritol ether, polyglyceryl sorbitol, sorbitol, urea, xylitol, or the like, or combinations thereof. In a preferred implementation, the solid cleansing composition includes glycerin.

In at least one implementation, the solid cleansing composition may include one or more free fatty acids configured to provide enhanced skin feel benefits. For example, the solid cleansing composition may include the fatty acids to provide softer or smoother feeling skin. Illustrative fatty acids may include, but are not limited to, fatty acids of palm kernel oil, palm oil, coconut oil, olive oil, laurel oil, or the like, or combinations thereof. Illustrative fatty acids may also include animal fats, such as tallow. Illustrative fatty acids may also include, but are not limited to, fatty acid sources having fatty acid distributions similar or substantially similar to natural or synthetic fatty acid sources (e.g., natural animal fats or oils, natural vegetable fats or oils, individual fatty acids, etc.). The free fatty acids may be separate from the fatty acids associated with the plant oils. In a preferred implementation, the fatty acid sources may be natural fatty acid sources.

The free fatty acids may be present in the solid cleansing composition in an amount of from about 2 wt % to about 15 wt %, based on the total weight of the solid cleansing composition. For example, the free fatty acids may be present in an amount of from about 2 wt %, about 3 wt %, about 4 wt %, about 5 wt %, about 6 wt %, or about 7 wt % to about 8 wt %, about 9 wt %, about 10 wt %, about 11 wt %, about 12 wt %, about 13 wt %, about 14 wt %, or about 15 wt %, based on the total weight of the solid cleansing composition. In another example, the free fatty acids may be present in an amount of from about 2 wt % to about 15 wt %, about 5 wt % to about 10 wt %, preferably about 6 wt % to about 9 wt %, or more preferably about 7 wt % to about 8 wt %, based on the total weight of the solid cleansing composition.

The solid cleansing composition may include one or more skin care agents. Any suitable skin care agents that do not adversely affect the stability and/or efficacy of the solid cleansing composition may be used. In at least one implementation, the skin care agent may include an emollient configured to maintain a soft, smooth, and pliable appearance to the skin. As is known by those skilled in the art, the emollients may function by remaining on the surface of the skin or in the stratum corneum to act as a lubricant, to reduce flaking, and/or to improve the appearance of the skin.

The skin care agents may generally include one or more polymers (e.g., polyvinylpyrrolidine), protein derivatives (e.g., derivatized hydrolyzed wheat protein), ethoxylated fatty ethers, cellulosics (e.g., hydroxyethylcellulose), or the like, or mixtures and combinations thereof. Illustrative skin care agents may include, but are not limited to, esters comprising an aliphatic alcohol having about 2 to about 18 carbon atoms condensed with an aliphatic or aromatic carboxylic acid including about 8 to about 20 carbon atoms (e.g., isopropyl myristate, decyl oleate, cetearyl isononanate, etc.). The esters may be straight chained or branched. In a preferred implementation, the ester has a molecular weight of less than about 500.

Other skin care agents may include, but are not limited to, polyvinyl-pyrrolidone, polyquaternium-4, polyquaternium-6, polyquaternium-7, polyquaternium-10, guar gum derivatives, hydroxypropylmethylcellulose, hydroxyethylcellulose, a polyethylene glycol, a methyl ether of a polyethylene glycol, quaternium-79, wheat germamidopropyl hydroxypropyl dimonium hydrolyzed wheat protein, stearyl methicone, dimethicone copolyol, dimethicone propyl PG betaine, poly(sodium styrene sulfonate), sorbitan oleate, steareth-2, steareth-21, isoceteth-20, PEG-7 glyceryl cocoate, PEG-75 lanolin, glycereth-26, PPG-5-ceteth-20, a $C_{12}$-$C_{20}$ alcohol, canola oil, glyceryl laurate, triglyceryl monostearate, glyceryl monostearate, vitamin E acetate, sunflower seed amidopropylethyldimonium ethylsulfate, sodium PEG-7 olive oil carboxylate, PPG-1 hydroxyethyl caprylamide, PPG-2 hydroxyethyl cocamide, mineral oil, petrolatum, aloe barbadensis, isostearamidopropylmorpholine lactate, strontium acetate, palmitamidopropyltrimonium chloride, or the like, or combinations thereof. In a preferred implementation, the skin care agent excludes, is free, or substantially free of the polyquats (e.g., polyquaternium-4/6/7/10, etc.).

The solid cleansing composition may include one or more salts capable of or configured to modify the one or more surfactants of the solid cleansing composition. For example, the salts may be configured to at least partially modify a cloud point of the surfactants to thereby control the haze or transparency of the cleansing composition. The salts may be or include one or more inorganic salts including, but not limited to, sodium sulfate, magnesium sulfate, sodium chloride, sodium citrate, or the like, or combinations thereof. The amount of any one or more of the salts may be at least partially determined by the type and/or amount of the surfactants included in the solid cleansing composition. In at least one implementation, the amount of any one or more of the salts may be about 0.1 weight %, 0.2 weight %, 0.3 weight %, 0.4 weight %, or 0.5 weight % to about 0.6 weight %, 0.7 weight %, 0.8 weight %, 0.9 weight %, or about 1.0 weight %.

The solid cleansing composition may include one or more additional ingredients. Illustrative ingredients may include, but are not limited to, one or more dyes, fragrances (e.g., limonene, ethyl butyrate, linalool, and/or oils, such as citronellol, coumarin, benzyl salicylate, etc.), buffers and buffering agents (e.g., inorganic phosphates, sulfates, and carbonates), pH adjusters (e.g., acids and/or bases), preservatives (e.g., parabens, hydantoins, imidazolines, etc.), thickeners, viscosity modifiers, antioxidants (e.g., etidronic acid, etc.), foam enhancers, chelating agents (e.g., EDTA, phosphates, pentasodium pentetate, etidronic acid, etc.), skin conditioning agents, opacifiers, hydric solvents, hydrotropes, antimicrobials, sunscreen actives, anti-aging compounds, vitamins, essential oils and extracts (e.g., rosewood, jojoba, etc.), polyols, titanium dioxide, abrasives (e.g., particulate matter), acaricidal agents (e.g., benzyl benzoate), or the like, or combinations thereof.

Illustrative antimicrobials may be or include, but are not limited to, trichlorocarbanilide (TCC), triclosan, geraniol, carvacrol, citral, eucalyptol, catechol, 4-allylcatechol, hexyl resorcinol, methyl salicylate, triclocarban, or the like, or combinations thereof. Illustrative anti-aging compounds may include, but are not limited to, alpha hydroxy acids, beta hydroxy acids, polyhydroxy acids, or the like, or combinations thereof. Illustrative sunscreen actives may include, but are not limited to, butyl methoxy benzoylmethane, or the like, or combinations thereof. Illustrative polyols may include, but are not limited to, glycerol, sorbitol, propylene glycol, polyethylene glycol, or the like, or combinations thereof. Illustrative abrasives or particulate matter may include, but are not limited to, silica, talc, calcium carbonate, polyethylene beads, jojoba beads, lufa, oat flour, or the like, or combinations thereof. Illustrative vitamins may include, but are not limited to, vitamins such as vitamin A, E, K, C, or combinations thereof.

The solid cleansing composition may include preservatives in an amount greater than 0.00 weight % and less than or equal to about 3.0 weight % or less than or equal to about 2.0 weight %. Illustrative preservatives may include, but are not limited to, benzalkonium chloride; benzethonium chloride, 5-bromo-5-nitro-1,3-dioxane; 2-bromo-2-nitropropane-1,3-diol; alkyl trimethyl ammonium bromide; N-(hydroxymethyl)-N-(1,3-dihydroxy methyl-2,5-dioxo-4-imidaxolidinyl-N-(hydroxy methyl)urea; 1-3-dimethyol-5, 5-dimethyl hydantoin; formaldehyde; iodopropynl butyl carbamate, butyl paraben; ethyl paraben; methyl paraben; propyl paraben, mixture of methyl isothiazolinone/methylchloroisothiazoline in a 1:3 wt. ratio; mixture of phenoxythanol/butyl paraben/methyl paraben/propylparaben; 2-phenoxyethanol; tris-hydroxyethyl-hexahydrotriazine; methylisothiazolinone; 5-chloro-2-methyl-4-isothiazolin-3-one; 1,2-dibromo-2,4-dicyanobutane; 1-(3-chloroalkyl)-3,5,7-triaza-azoniaadam-antane chloride; sodium benzoate; organic acids, sorbic acid, lactic acid, citric acid, or the like, or combinations thereof.

The solid cleansing composition may include one or more plant oils. As used herein, "plant oil" may refer to oil that is obtained from a plant, or manufactured oil made by blending at least two components of oil (e.g., triglycerides, saturated and/or unsaturated fatty acids, etc.) to substantially mimic the composition of a natural plant oil or provide an oil substantially similar in composition to a plant oil. For example, a manufactured oil substantially similar in composition to a plant oil may include at least 50 weight %, at least 60 weight %, at least 70 weight %, at least 80 weight %, at least 90 weight %, at least 95 weight %, at least 98 weight %, at least 99 weight %, at least 99.5 weight %, at least 99.9 weight %, or 100 weight % of the components that are naturally found in the plant oil that the manufactured oil is designed to substantially mimic.

Illustrative plant oils may be or include, but are not limited to, palm oil, palm kernel oil, palm kernel olein, palm stearin oil, palm kernel olein oil, coconut oil, avocado oil, canola oil, corn oil, cottonseed oil, olive oil, high-oleic sunflower oil, mid-oleic sunflower oil, sunflower oil, safflower oil, babassu oil, sweet almond oil, castor oil, canola oil, soybean oil, olive oil, acai oil, andiroba oil, apricot kernel oil, argan oil, passion fruit oil, marula oil, mango oil, shea oil, macadamia nut oil, brazil nut oil, borage oil, copaiba oil, grape seed oil, buriti oil, sesame oil, flaxseed oil or linseed oil, blueberry oil, cranberry oil, blackberry oil, plum oil, raspberry oil, camelina oil, camellia oil, walnut oil, wheat germ oil, calendula oil, cherry kernel oil, cucumber seed oil, papaya oil, aloe vera oil, hemp oil, or the like, or mixtures or combinations thereof. In a preferred implementation, the plant oil includes at least palm oil.

The one or more plant oils may be or include components of any one or more of the plant oils. For example, in at least one implementation, the plant oils may include one or more components or fractions of the plant oil. For example, palm oil may include a liquid fraction, referred to as palm olein, and a solid fraction, referred to as palm stearin. In a preferred implementation, the one or more plant oils may include at least palm oil, palm stearin, palm kernel olein, or combinations thereof.

The amount or concentration of the one or more plant oils present in the solid cleansing composition may vary widely. In at least one implementation, the amount of the one or more plant oils present in the solid cleansing composition may be from greater than 0 weight % to less than or equal to 5 weight %, based on the total weight of the solid cleansing composition. For example, the amount of the one or more plant oils present in the solid cleansing composition may be from greater than 0 weight %, about 0.5 weight %, about 1 weight %, about 1.5 weight %, about 2 weight %, or about 2.5 weight % to about 3 weight %, about 3.5 weight %, about 4 weight %, about 4.5 weight %, or about 5 weight %, based on the total weight of the solid cleansing composition. In another example, the amount of the one or more plant oils present in the solid cleansing composition may be from greater than 0 weight % to about 5 weight %, about 0.5 weight % to about 4.5 weight %, about 1 weight % to about 4 weight %, about 1.5 weight % to about 3.5 weight %, or about 2 weight % to about 3 weight %. In another implementation, the amount of the one or more plant oils present in the solid cleansing composition may be from greater than 0 weight % to less than or equal to 1 weight %, based on a total weight of the solid cleansing composition. For example, the amount of the one or more plant oils present in the solid cleansing composition may be from greater than 0 weight %, about 0.1 weight %, about 0.2 weight %, about 0.3 weight %, about 0.4 weight %, or about 0.45 weight % to about 0.5 weight %, about 0.6 weight %, about 0.7 weight %, about 0.8 weight %, about 0.9 weight %, or about 1.0 weight %. In another example, the amount of the one or more plant oils present in the solid cleansing composition may be from greater than 0 weight % to about 1.0 weight %, about 0.1 weight % to about 0.9 weight %, about 0.2 weight % to about 0.8 weight %, about 0.3 weight % to about 0.7 weight %, about 0.4 weight % to about 0.6 weight %, or about 0.45 weight % to about 0.5 weight %.

The solid cleansing composition may include one or more hydrolyzed proteins. The hydrolyzed proteins may be completely hydrolyzed or partially hydrolyzed. Illustrative hydrolyzed proteins may be or include, but are not limited to, hydrolyzed gelatin, hydrolyzed collagen, hydrolyzed casein, hydrolyzed whey protein, hydrolyzed milk protein, hydrolyzed soy protein, hydrolyzed egg protein, hydrolyzed wheat protein, amino acids, peptides, and the like, or combinations thereof. In a preferred implementation the hydrolyzed protein includes hydrolyzed milk protein, such as CAS 92797-39-2 (EINECS: 296-575-2). For example, the hydrolyzed protein may be or include a hydrolyzed phosphoprotein derived from natural dairy protein, such as MILK TEIN NPNF®, which is commercially available from Tri-K Industries Inc. of Denville, NJ.

The hydrolyzed milk protein may be or include milk protein hydrolyzed by an enzyme. For example, a milk protein may be enzymatically hydrolyzed to provide the hydrolyzed milk protein.

The hydrolyzed protein may be a solution or mixture. In one implementation, the hydrolyzed protein may be provided as a pure or substantially pure solution. In another implementation, the hydrolyzed protein may be provided as a solution including one or more hydrolyzed proteins dissolved, mixed, or otherwise dispersed in the solution. In at least one implementation, the hydrolyzed protein may be an aqueous solution including the hydrolyzed protein in an amount of from greater than 0 weight % to less than or equal to 50 weight %. For example, a hydrolyzed protein solution may be an aqueous solution including one or more hydrolyzed proteins in an amount of from greater than 0 weight %, about 5 weight %, about 10 weight %, about 15 weight %, about 18 weight %, or about 20 weight % to about 25 weight %, about 30 weight %, about 35 weight %, about 40 weight %, about 45 weight %, or about 50 weight %. In another example, the hydrolyzed protein solution may be an aqueous solution including one or more hydrolyzed proteins in an amount of from greater than 0 weight % to about 50 weight %, about 5 weight % to about 45 weight %, about 10 weight % to about 40 weight %, about 15 weight % to about 35 weight %, about 20 weight % to about 30 weight %, or about 20 weight % to about 25 weight %. In a preferred implementation, the hydrolyzed protein solution is an aqueous solution including about 22 weight % of the hydrolyzed protein in water. In a more preferred implementation, the hydrolyzed protein solution is an aqueous solution including about 22 weight % of hydrolyzed milk protein in water.

The amount or concentration of the hydrolyzed protein solution present in the solid cleansing composition may vary widely. In at least one implementation, the amount of the hydrolyzed protein solution (e.g., a 22 weight % solution of hydrolyzed proteins) present in the solid cleansing composition may be from greater than 0 weight % to less than or equal to 10 weight %, based on the total weight of the solid cleansing composition. For example, the amount of the hydrolyzed protein solution present in the solid cleansing composition may be from greater than 0 weight %, about 1 weight %, about 2 weight %, about 3 weight %, about 4 weight %, or about 5 weight % to about 6 weight %, about 7 weight %, about 8 weight %, about 9 weight %, or about 10 weight %, based on a total weight of the solid cleansing composition. In another example, amount of the hydrolyzed protein solution present in the solid cleansing composition may be from greater than 0 weight %, about 0.2 weight %, about 0.4 weight %, about 0.6 weight %, about 0.8 weight % or about 1.0 weight % to about 1.2 weight %, about 1.4 weight %, about 1.6 weight %, about 1.8 weight %, or about 2.0 weight %, based on the total weight of the solid cleansing composition.

The amount or concentration of the one or more hydrolyzed proteins present in the solid cleansing composition may vary widely. In at least one implementation, the amount of the one or more hydrolyzed proteins present in the solid cleansing composition may be from greater than 0 weight % to less than or equal to 1 weight %, based on the total weight of the solid cleansing composition. For example, the amount of the one or more hydrolyzed proteins present in the solid cleansing composition may be from greater than 0 weight %, about 0.05 weight %, about 0.1 weight %, about 0.15 weight %, about 0.2 weight %, about 0.25 weight %, about 0.3 weight %, about 0.35 weight %, about 0.4 weight %, about 0.45 weight %, or about 0.5 weight % to about 0.55 weight %, about 0.6 weight %, about 0.65 weight %, about 0.7 weight %, about 0.75 weight %, about 0.8 weight %, about 0.85 weight %, about 0.9 weight %, about 0.95 weight %, or about 1 weight %, based on the total weight of the solid cleansing composition. In a preferred implementation, the amount of the one or more hydrolyzed proteins present in the solid cleansing composition may be from about 0.15 weight % to about 0.3 weight %, more preferably about 0.2 weight % to about 0.25 weight %, even more preferably about 0.22 weight %, based on the total weight of the solid cleansing composition.

In an exemplary implementation, the solid cleansing composition excludes the one or more hydrolyzed proteins. For example, the solid cleansing composition may be free or substantially free of the hydrolyzed proteins. Accordingly, in an exemplary implementation, the solid cleansing composition may include flaxseed oil and exclude the hydrolyzed proteins.

In at least one implementation, the cleansing component of the solid cleansing composition comprises synthetic surfactants. For example, the solid cleansing composition is a syndet including one or more whitening agents. The whitening agent of the syndet may be or include a metal oxide. For example, the whitening agent of the syndet may include zinc oxide. In at least one implementation, the whitening agent of the syndet may exclude, be free, or substantially free of clays, coloring agents, or combinations thereof. For example, the whitening agent of the syndet may be free or substantially free of both clays, such as bentonite and/or kaolin clay, and pigments. In at least one implementation, the whitening agent of the syndet may exclude, be free, or substantially free of titanium dioxide.

Methods

The present disclosure may provide methods for preparing a solid cleansing composition. The method may include mixing, stirring, combining, or otherwise contacting a cleansing component and one or more whitening agents with one another. In at least one example, the solid cleansing composition is a bar soap. The one or more whitening agents may be or include one or more clays, such as bentonite clay and/or kaolin clay, one or more metal oxides, such as a ZnO powder or slurry, one or more coloring agents, such as pigment blue, or combinations thereof. The cleansing component may include one or more soaps (e.g., fatty acid soaps), one or more synthetic surfactants, or combinations thereof.

The present disclosure may provide methods for treating, decreasing, reducing, or preventing damage to the skin and/or providing skin protection benefits against UV radiation by reducing reactive oxygen species in and on the skin. The method may include contacting an effective amount of any one or more of the personal care compositions disclosed herein with the skin. For example, the method may include contacting an effective amount of a personal care composition including a synergistic amount of the cleansing component and/or the one or more whitening agents with the skin. The one or more whitening agents may be or include one or more clays, such as bentonite clay and/or kaolin clay, one or more metal oxides, such as a ZnO powder or slurry, one or more coloring agents, such as pigment blue, or combinations thereof. The cleansing component may include one or more soaps (e.g., fatty acid soaps), one or more synthetic surfactants, or combinations thereof.

The present disclosure may also provide a solid cleansing composition including a cleansing component and one or more whitening agents for use in treating, decreasing, reducing, or preventing damage to the skin and/or providing skin protection benefits against atmospheric or environmental pollution by reducing reactive oxygen species in and on the skin. The one or more whitening agents may be or include one or more clays, such as bentonite clay and/or kaolin clay, one or more metal oxides, such as a ZnO powder or slurry, one or more coloring agents, such as pigment blue, or combinations thereof. The cleansing component may include one or more soaps (e.g., fatty acid soaps), one or more synthetic surfactants, or combinations thereof.

EXAMPLES

The examples and other implementations described herein are exemplary and not intended to be limiting in describing the full scope of compositions and methods of this disclosure. Equivalent changes, modifications and variations of specific implementations, materials, compositions and methods may be made within the scope of the present disclosure, with substantially similar results.

Example 1

One or more whitening agents were evaluated for their efficacy in providing whiteness to a base bar soap composition. The base bar soap composition (1) was prepared by combining the ingredients/components according to Table 1. Six bar soap compositions (2)-(7) were then prepared by adding different amounts of the one or more whitening agents to the base bar soap composition (1), according to Table 2. As indicated in Table 2, the whitening agents included titanium dioxide ($TiO_2$), calcined kaolin clay, and zinc oxide (ZnO). The $TiO_2$ had a refractive index of about 2.73, the ZnO had a refractive index of about 2.02, and the calcined kaolin clay had a refractive index of about 1.65.

The whiteness was measured by comparing UV emissions at a wavelength of from about 420 nm to about 720 nm, and was assessed on the Hunter L, a, b, scale. The whiteness (L*) is summarized in Table 2.

TABLE 1

Composition of Base Bar Soap Composition (1)

| Ingredient/Component |
|---|
| Soap chips containing tallowate and laurate |
| Minors/Excipients |

TABLE 2

Compositions and Whiteness of Control and Test Bar Soap Compositions (1)-(7)

| # | Base Bar Soap Composition (wt %) | $TiO_2$ (wt %) | Kaolin Clay (wt %) | ZnO (wt %) | L* |
|---|---|---|---|---|---|
| (1) | 100.0 | — | — | — | 80.90 |
| (2) | 99.6 | 0.4 | — | — | 90.28 |
| (3) | 97.5 | — | 2.5 | — | 85.60 |
| (4) | 95.0 | — | 5.0 | — | 87.04 |
| (5) | 95.0 | — | — | 5.0 | 94.08 |
| (6) | 90.0 | — | — | 10.0 | 95.85 |
| (7) | 97.0 | — | 2.5 | 0.5 | 89.50 |

As indicated by the whiteness (L*) in Table 2, it was observed that the base bar soap composition (1) was the least white, followed by the test bar soap composition (3) including 2.5% kaolin clay, followed by the test bar soap composition (4) including 5.0% kaolin clay, followed by the test bar soap composition (7) including 2.5% kaolin clay and 0.5% ZnO, and followed by the test bar soap composition (2) including 0.4% $TiO_2$, followed by the test bar soap composition (5) including 5.0 wt % ZnO, and followed by the test bar soap composition (6) including 10.0 ZnO. It was surprisingly and unexpectedly discovered that the combination of clay and ZnO provided whiteness comparable to the bar soap composition (2) including $TiO_2$. Particularly, it was surprisingly and unexpectedly discovered that the combination of about 2.5% kaolin clay and about 0.5% ZnO was an effective replacement for $TiO_2$. It was also surprisingly and unexpectedly discovered that the addition of kaolin clay reduced the amount of ZnO necessary to achieve sufficient whiteness.

Example 2

One or more whitening agents were evaluated for their efficacy in providing whiteness to a base bar soap composition. Two base bar soap composition (8) and (9) were prepared by combining the ingredients/components according to Tables 3 and 4, respectively. Ten bar soap compositions (10)-(19) were then prepared by adding varying amounts of the one or more whitening agents to one of the base bar soap compositions (8) and (9), according to table 5. As indicated in Table 5, the whitening agents included $TiO_2$, bentonite, ZnO, and pigment blue #29, commercially available from BASF of Florham Park, NJ.

TABLE 3

| Composition of Base Bar Soap Composition (8) |
|---|
| Ingredient/Component |
| Soap chips containing 40% palm oil, 40% palm stearin, 20% palm kernel olein, EDTA, citric acid |
| Minors/Excipients |

TABLE 4

| Composition of Base Bar Soap Composition (9) |
|---|
| Ingredient/Component |
| Soap chips containing 30% Tallow, 50% palm stearin, 20% palm kernel olein |
| Minors/Excipients |

TABLE 5

Compositions of Control and Test Bar Soap Compositions (9)-(19)

| # | Base Bar Soap Composition (wt %) | $TiO_2$ (wt %) | Bentonite (wt %) | ZnO (wt %) | Pigment Blue (wt %) |
|---|---|---|---|---|---|
| (8) | 100 | — | — | — | — |
| (9) | 100 | — | — | — | — |
| (10) [A] | 99.65 | 0.35 | — | — | — |
| (11) [A] | 97.5 | — | 2.5 | — | — |
| (12) [A] | 95 | — | 5.0 | — | — |
| (13) [A] | 99 | — | — | 1.0 | — |
| (14) [A] | 98 | — | — | 2.0 | — |
| (15) [A] | 95 | — | — | 5.0 | — |
| (16) [A] | 90 | — | — | 10.0 | — |
| (17) [A] | 98.9998 | — | — | 1.0 | 0.0002 |
| (18) [A] | 96.9998 | — | 1.5 | 1.5 | 0.0002 |
| (19) [B] | 96.9998 | — | 1.5 | 1.5 | 0.0002 |

[A] Base bar soap composition (8) utilized
[B] Base bar soap composition (9) utilized The Hunter Index for whiteness was utilized to quantify the whiteness of each of the control bar soap compositions (8) and (9) and the test bar soap compositions (10)-(19). The whiteness was measured by comparing UV emissions at a wavelength of from about 420 nm to about 720 nm, and the color was assessed on the Hunter L, a, b, scale. It should be appreciated that a lower b* value indicates a relatively lower yellowish final color, and the L* value indicates the whiteness. The whiteness according to the Hunter Index is summarized in Table 6.

TABLE 6

Hunter Index Values for Bar Soap Compositions (8)-(19)

| Bar Soap Composition | b* | L* |
|---|---|---|
| (8) | 22.66 | 72.98 |
| (9) | — | — |
| (10) | 9.19 | 89.80 |
| (11) | 12.22 | 85.10 |
| (12) | 21.52 | 74.29 |
| (13) | 15.11 | 86.01 |
| (14) | 12.99 | 89.2 |
| (15) | 6.82 | 94.08 |
| (16) | 5.43 | 95.85 |
| (17) | 10.62 | 86.60 |
| (18) | 9.58 | 88.04 |
| (19) | 9.89 | 87.83 |

As indicated in Table 6, it was surprisingly and unexpectedly discovered that the combination of clay, ZnO, and Pigment Blue provided whiteness comparable to the bar soap composition (10) including $TiO_2$. Particularly, it was surprisingly and unexpectedly discovered that the combination of about 1.5% bentonite clay, about 1.5% ZnO, and about 0.0002% pigment blue was an effective replacement for $TiO_2$ in the bar soap composition (8) as well as the tallow based bar soap composition (9).

Example 3

The residual antibacterial efficacy of ZnO in various base bar soap compositions was evaluated. Specifically, three base bar soap compositions (20)-(22) were prepared according to Tables 7-9, respectively. The three base bar soap compositions (20)-(22) were utilized to prepare three test bar soap compositions, each including about 1.5 wt % ZnO. Each of the base bar soap compositions (20)-(22) without the ZnO and the test bar soap compositions including the ZnO were then evaluated for residual antibacterial efficacy against *E. coli* and *S. aureus*.

TABLE 7

| Composition of Base Bar Soap Composition (20) |
|---|
| Ingredient/Component |
| Soap chips containing 40% palm oil, 40% palm stearin, 20% palm kernel olein, EDTA, citric acid |
| Bentonite |
| Yogurt Protein |
| Minors/Excipients |

TABLE 8

| Composition of Base Bar Soap Composition (21) |
|---|
| Ingredient/Component |
| Soap chips containing 40% palm oil, 40% palm stearin, 20% palm kernel olein, EDTA, citric acid |
| Bentonite |
| Flax Seed Oil |
| Minors/Excipients |

TABLE 9

| Composition of Base Bar Soap Composition (22) |
|---|
| Ingredient/Component |
| Soap chips containing 40% palm oil, 40% palm stearin, 20% palm kernel olein, EDTA, citric acid |
| Bentonite |

TABLE 9-continued

| Composition of Base Bar Soap Composition (22) |
|---|
| Ingredient/Component |
| Dimethyl Polysiloxane |
| Polyquaternium-6 (40%) |
| Petrolatum |
| Minors/Excipients |

*E. coli* and *S. aureus* cultures were prepared according to manufacturer's instructions. The culture concentration was then adjusted to OD 0.1 units (620 nm) to challenge the antibacterial activity. Ex-vivo porcine skin obtained from Animal Technologies, Inc. of Tyler, TX was utilized. The fat and hair were removed from the porcine skin, the skin was then cut into 2"×4" pieces, gamma irradiated (25-40 kGy), and immediately frozen and stored at −80° C.

To evaluate the residual antibacterial efficacy, a gloved hand was used to wet the porcine skin and the soap bar under running tap water. The soap bar was then rubbed against the skin for about 15 seconds. The skin was then lathered for about 45 seconds and rinsed for about 15 seconds by holding it at about 45° to allow the water to impinge on the top and cascade across the entire skin surface. The skin was then air dried for about 15 minutes before bacterial inoculation. After drying, a circular area (7.1 $cm^2$) was delineated on the porcine skin and inoculated with 25 μL of the bacterial inoculum (107 CFU/ml). The skin was then incubated at about 33° C. for about 3 hours for *E. coli* and about 5 hours for *S. aureus*. The bacteria were harvested using Letheen Broth (LB). The harvesting procedure involved pipetting 2 mL of LB into a hollow glass cylinder cup placed on the circular area, massaging the skin for about 60 seconds with a sterile glass rod, and transferring the fluid to a test tube. The sample was then serially diluted 10-fold in LB and plated in duplicate on Trypticase Soy Agar (TSA) plates, 10-1-10-4 dilutions. The agar plates were incubated at about 33° C. for about 24 hours. After incubation, surviving colonies were counted following standard microbial counting techniques.

Each sample was tested multiple times independently (N=3 or 4). The colony counts in duplicate were converted to mean log colony forming units (CFU/7.1 $cm^2$). Paired t-test was performed to determine if significant bacterial count reductions existed when compared to the corresponding placebos at the 95% confidence interval (CI). The results for *E. coli* and *S. aureus* are summarized in Tables 10 and 11, respectively.

TABLE 10

*E. coli* Count of Base Bar Soap Compositions (20)-(22) With and Without ZnO

| Bar Soap Composition | Zinc Oxide (wt %) | Mean | Std. Dev. | Δ Count w/ ZnO | t-Test |
|---|---|---|---|---|---|
| (20) | — | 6.48 | 0.36 | −0.23 | 0.031 |
| (20) + ZnO | 1.5 | 6.25 | 0.33 | | |
| (21) | — | 6.04 | 0.52 | −0.51 | 0.037 |
| (21) + ZnO | 1.5 | 5.53 | 0.59 | | |
| (22) | — | 6.26 | 0.40 | −0.26 | 0.040 |
| (22) + ZnO | 1.5 | 5.99 | 0.53 | | |

TABLE 11

*S. aureus* Count of Base Bar Soap Compositions (20)-(22) With and Without ZnO

| Bar Soap Composition | Zinc Oxide (wt %) | Mean | Std. Dev. | Δ Count w/ ZnO | t-Test |
|---|---|---|---|---|---|
| (20) | — | 7.60 | 0.17 | −0.17 | 0.003 |
| (20) + ZnO | 1.5 | 7.43 | 0.16 | | |
| (21) | — | 7.61 | 0.11 | −0.09 | 0.042 |
| (21) + ZnO | 1.5 | 7.52 | 0.14 | | |
| (22) | — | 7.59 | 0.20 | −0.15 | 0.023 |
| (22) + ZnO | 1.5 | 7.44 | 0.29 | | |

It was surprisingly and unexpectedly discovered that the inclusion of ZnO significantly (p-value<0.05) inhibited growth of both *E. coli* and *S. aureus* as compared to the base bar soap compositions (20)-(22) alone. The residual antibacterial efficacy was more pronounced against *E. coli* than *S. aureus*.

PROPHETIC EXAMPLES

Embodiments discussed and described herein may be further described with the following prophetic examples. Although the simulated examples are directed to specific embodiments, they are not to be viewed as limiting in any specific respect.

Prophetic Example 1

In Prophetic Example 1, the skin protecting benefits of bar soap compositions with and without ZnO would be determined. Particularly, a base bar soap composition without ZnO would be prepared and evaluated for its respective skin protecting benefits, such as UV protecting benefits. Varying concentrations of ZnO, for example, about 1.5 wt % of ZnO, would then be added to the base bar soap compositions to thereby prepare test bar soap compositions. Each of the test bar soap compositions would then be evaluated for its respective skin protecting benefits and compared with the base bar compositions that excluded the ZnO.

The skin protecting benefits would be evaluated in vitro. The skin protecting benefit would be evaluated by observing the bar soap composition's ability to prevent the generation of reactive oxygen species (ROS) after treatment with the bar soap compositions and exposure to UV radiation. The skin protecting benefit would also be evaluated by observing the bar soap composition's ability to reduce the presence of reactive oxygen species (ROS) after exposure to UV radiation. Skin is often exposed to various environmental stressors, including UV radiation. UV radiation may react with the skin to generate ROS in and on the skin that can lead to oxidative cell damage or cell death. Accordingly, an in vitro study would be conducted to analyze the efficacy of varying concentrations of ZnO for reducing and/or preventing ROS in and on the skin.

To conduct the study, skin cells, such as neonatal human epidermal keratinocytes (HEKn), would be grown in standard well plates having glass bottoms coated with collagen I. The HEKn would be cultured in EpiLife™ media supplemented with human keratinocyte growth supplements (HKGS), both of which are commercially available from ThermoFisher Scientific of Waltham, MA. Stock solutions or slurries of the bar soap compositions were be prepared for the treatment of the keratinocytes.

The presence or amount of intracellular reactive oxygen species (ROS) would be measured using fluorescence microscopy. Specifically, the keratinocytes would be exposed to an oxidative stress detection reagent for a predetermined amount of time in the absence (i.e., control) or presence of ZnO and/or UV radiation. After exposure to the oxidative stress detection reagent and the ZnO and/or UV radiation, the keratinocytes would be washed with a wash buffer and imaged via fluorescence in the wash buffer. Live adherent cells would be imaged using GFP excitation/emission filters, and the ROS levels would be quantified from raw images using ImageJ software.

The expected results of the skin protecting benefits of ZnO are that skin treated with the bar soap compositions including the ZnO would exhibit relatively lower ROS, reduced ROS, or statistically significant skin protection compared to the base bar soap compositions without the ZnO.

Prophetic Example 2

In Prophetic Example 2, the skin protecting benefits of bar soap compositions with and without ZnO would be determined. Particularly, a base bar soap composition without ZnO would be prepared and evaluated for its respective skin protecting benefits, such as UV protecting benefits. Varying concentrations of ZnO, for example, about 1.5 wt % of ZnO, would then be added to the base bar soap compositions to thereby prepare test bar soap compositions. Each of the test bar soap compositions would then be evaluated for its respective skin protecting benefits and compared with the base bar compositions that excluded the ZnO.

The skin protecting benefits would be evaluated in vitro. The skin protecting benefit would be evaluated by observing lipid peroxidation in skin exposed to UV radiation treated with the bar soap compositions. The amount of lipid peroxidation present in and/or on the skin would be measured with a lipid peroxidation assay kit, which monitors the presence of a biomarker for lipid peroxidation; specifically, the presence of malondialdehyde (MDA), a byproduct of lipid peroxidation. Pig skins would be utilized as skin models for each of the bar soap compositions. Particularly, respective pieces defrosted pig skins would be utilized as samples. Each of the bar soap compositions would be tested on the defrosted pig skins.

To evaluate the bar soap compositions, each of the pig skin samples would be pre-wetted with running water for a predetermined amount of time, contacted or rubbed with either the bar soap composition for about a predetermined amount of time, then lathered with a gloved finger for a predetermined amount of time. After pre-wetting, washing, and lathering, the pig skin samples would be allowed to rest for an additional period of time before rinsing with the tap water.

After rinsing, each of the pig skin samples would be exposed to UV radiation for a predetermined period of time. After exposing each of the pig skin samples to UV radiation, MDA would be extracted from each of the pig skin samples. The MDA would then be extracted from each of the pig skin samples via a cup scrub method. Particularly, a glass cup would be placed in the center of the pig skin samples, about 500 μL of ethanol would be disposed inside the cup and rubbed with a glass rod. The ethanol would be then be removed and disposed in a centrifuge tube. The process of extraction would be performed in duplicate, thereby resulting in a total of about 1 mL of ethanol. The extracted samples would be then be centrifuged.

To quantify the amount of MDA, a calibration curve would be prepared. Particularly, a 20 μM standard solution of MDA would be diluted to varying concentrations. A 25 ml solution of thiobarbituric acid (TBA) would be prepared by mixing one container of TBA powder (provided in the kit) with about 7.5 mL of acetic acid, and about 17.5 mL of deionized (DI) water. 200 μL of each of the respective MDA dilutions would be then be contacted with about 600 μL of the TBA solution, incubated at about 95° C. for about 60 min, and cooled in an icebox for about 10 min. 200 μL of the mixture would then be pipetted into a well plate in duplicate. Each sample would then be measured using a spectrophotometer. Specifically, each of the samples would be excited at a wavelength of about 532 nm and emission would be measured at a wavelength of about 553 nm. The measured emission intensity of each of the samples and the corresponding concentration of the dilute MDA solution would then be utilized to prepare the calibration curve.

To quantify the amount of MDA extracted from each of the pig skin samples, about 200 μL of the centrifuged MDA samples obtained from the cup scrub method would be contacted with about 600 μL of the TBA solution, incubated at about 95° C. for about 60 min, and cooled in an icebox for about 10 min. About 200 μL of the mixture would then be pipetted into a well plate in duplicate. Each sample would then be measured. The measured emission intensity of each of the samples would then be utilized to determine the amount of MDA in each of the samples extracted from the pig skins using the calibration curve.

The expected results of the skin protecting benefits of ZnO are that skin treated with the bar soap compositions including the ZnO would exhibit relatively lower amounts of MDA, a byproduct for lipid peroxidation.

The present disclosure has been described with reference to exemplary implementations. Although a limited number of implementations have been shown and described, it will be appreciated by those skilled in the art that changes may be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. A solid cleansing composition, comprising:

a cleansing component including soap chips that contain up to 40 wt % palm oil, up to 40 wt % palm stearin, and up to 20 wt % palm kernel olein, based on the total weight of the solid cleansing composition;

one or more whitening agents, wherein the whitening agents comprise a metal oxide, and a clay; and blue pigment present in an amount of from 0.0001 wt % to 0.0005 wt %, based on the total weight of the solid cleansing composition;

wherein the metal oxide is zinc oxide (ZnO) present in an amount of from 0.5 wt % to 1.5 wt %, based on the total weight of the solid cleansing composition, wherein the clay is bentonite or kaolin clay present in an amount of from 1.5 wt % to 2.5 wt %, based on the total weight of the solid cleansing composition, and wherein the solid cleansing composition demonstrates a whiteness, as measured via a hunter whiteness index (L) of from about 60 to about 90.

2. The solid cleansing composition of claim 1, wherein the zinc oxide (ZnO) is present in an amount of 0.5 wt %, based on the total weight of the solid cleansing composition, and wherein the clay is kaolin clay present in an amount of 2.5 wt %, based on the total weight of the solid cleansing composition.

3. The solid cleansing composition of claim 1, wherein the soap chips further comprise tallowate and laurate.

4. The solid cleansing composition of claim 1, wherein the whitening agents are substantially free of titanium dioxide.

5. The solid cleansing composition of claim 1, wherein the zinc oxide (ZnO) is present in an amount of 1.5 wt %, and the clay is bentonite present in an amount of about 1.5 wt %, all based on the total weight of the solid cleansing composition.

6. The solid cleansing composition of claim 1, wherein the soap chips further comprise EDTA, and citric acid.

7. The solid cleansing composition of claim 1, wherein the solid cleansing composition demonstrates a whiteness, as measured via a hunter whiteness index (L) of from about 80 to about 90.

8. The solid cleansing composition of claim 1, wherein the solid cleansing composition has a refractive index of from about 1.0 to about 3.0.

9. A method for preparing the solid cleansing composition of claim 1, the method comprising contacting the cleansing component, the one or more whitening agents, and the blue pigment with one another.

10. A method for treating or preventing damage to skin, the method comprising contacting the solid cleansing composition of claim 1 with the skin.

11. The method of claim 10, wherein the solid cleansing composition prevents lipid peroxidation of the skin.

12. A method for preventing antibacterial growth on skin, the method comprising contacting the solid cleansing composition of claim 1 with the skin.

13. The method of claim 12, wherein the antibacterial growth comprises *E. coli* growth.

14. The method of claim 12, wherein the antibacterial growth comprises *S. aureus* growth.

* * * * *